United States Patent [19]

Gill

[11] 3,939,935
[45] Feb. 24, 1976

[54] ELECTRIC POWER MEANS FOR VEHICLES
[76] Inventor: Walter L. Gill, 225 S. Buena Vista, Redlands, Calif. 92373
[22] Filed: May 17, 1974
[21] Appl. No.: 471,125

[52] U.S. Cl. ................... 180/65 R; 185/30; 320/61; 322/4
[51] Int. Cl.² ........................................ B60L 11/18
[58] Field of Search ............. 180/65 R, 65 A, 65 F; 320/61, 62, 2; 322/4, 3, 100; 290/1 R, 50, 53, 42, 43, 54; 185/29, 30, 4

[56] References Cited
UNITED STATES PATENTS

| | | | |
|---|---|---|---|
| 1,557,570 | 10/1925 | Eckman et al. | 180/65 R UX |
| 1,562,903 | 11/1925 | Miller | 180/65 R |
| 3,497,026 | 2/1970 | Calvert | 180/65 R |
| 3,774,048 | 11/1973 | Hardingham | 115/4 |

*Primary Examiner*—Robert R. Song
*Assistant Examiner*—Milton L. Smith
*Attorney, Agent, or Firm*—Imirie, Smiley & Linn

[57] ABSTRACT

A plurality of individual batteries are independently mounted for reciprocatory movement according to the motion of a supporting vehicle, and means are actuated by the reciprocal movement of the batteries for converting such movement to constant rotary movement to drive means for regenerating said batteries. The batteries are disposed in spaced relation to facilitate cooling.

10 Claims, 4 Drawing Figures

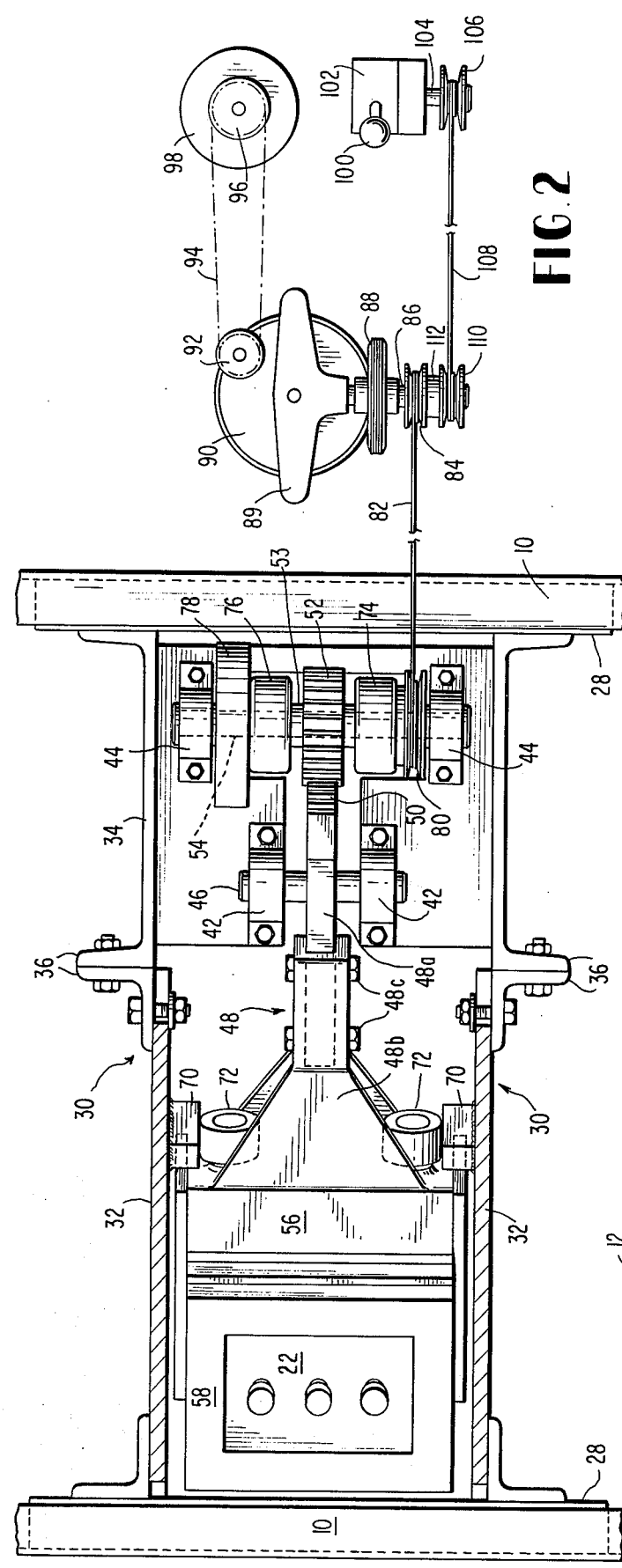
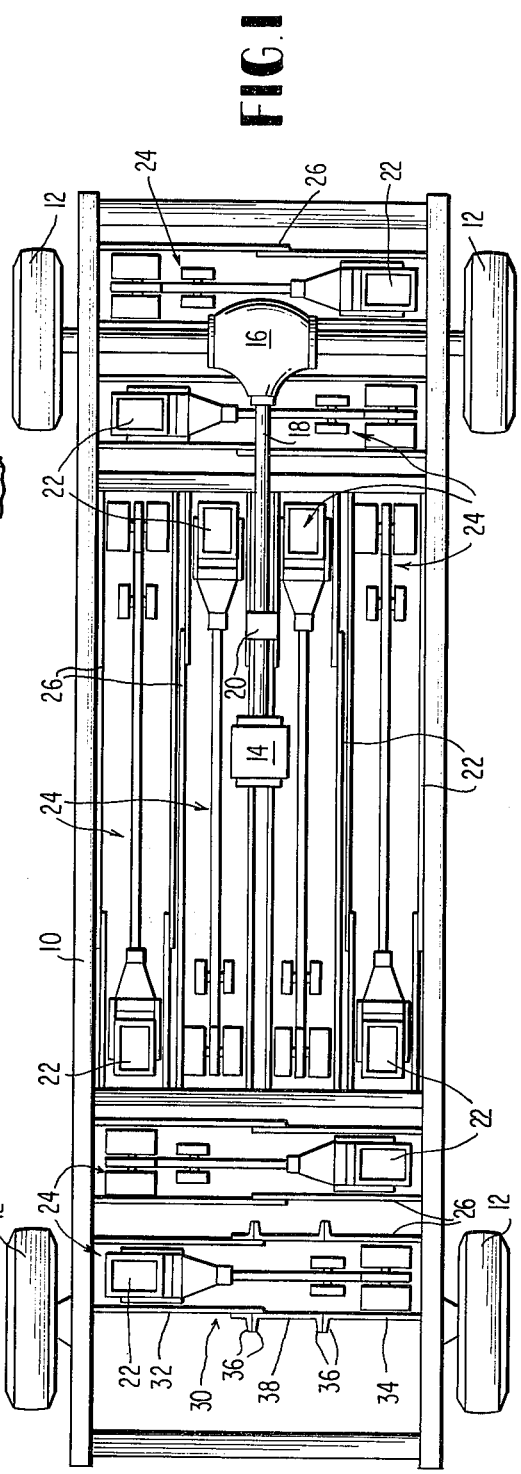
FIG. 1
FIG. 2

ELECTRIC POWER MEANS FOR VEHICLES

BACKGROUND OF THE INVENTION

For many years attempts have been made to supplement the electric power means for electric systems in vehicles and particularly vehicles that are driven by electric motors. For the most part these prior efforts have not been particularly successful because the drive for the generating means has been derived from motion between parts of the vehicle during travel and such motion has not been sufficient to produce the required current supply. Moreover, the batteries required for driving such vehicles or operating other electric systems in vehicles, normally are quite large and easily over-heat and also constitute a dead weight in the vehicle which requires more power for operating the vehicle.

SUMMARY OF THE INVENTION

According to the present invention, a plurality of individual batteries are independently resiliently mounted for reciprocatory movement according to motion of the vehicle and such movement is harnessed to drive the generating means. The individual mounting of the batteries in spaced relation from each other facilitates cooling of the batteries and thereby reduces if not eliminates over-heating of the batteries and the resilient mounting of the batteries for reciprocal movement eliminates the dead weight of the batteries and instead employs the physical movement of the batteries for actuating the generating means.

Conveniently, each battery is mounted on one end of a lever, the opposite end of which comprises a segment for driving means for converting reciprocal motion to rotary movement for driving a generating means. The batteries may be connected in series so that their voltage output is added to operate electric means requiring a stronger input, such as a motor for driving the vehicle.

BRIEF IDENTIFICATION OF THE DRAWINGS

FIG. 1 is a diagrammatic plan view of a vehicle chassis including self electric power generating units according to the present invention;

FIG. 2 is an enlarged fragmentary plan view of FIG. 1 showing one only of the self-generating units associated with a generating system;

DETAILED DESCRIPTION OF THE INVENTION

Figure 3:
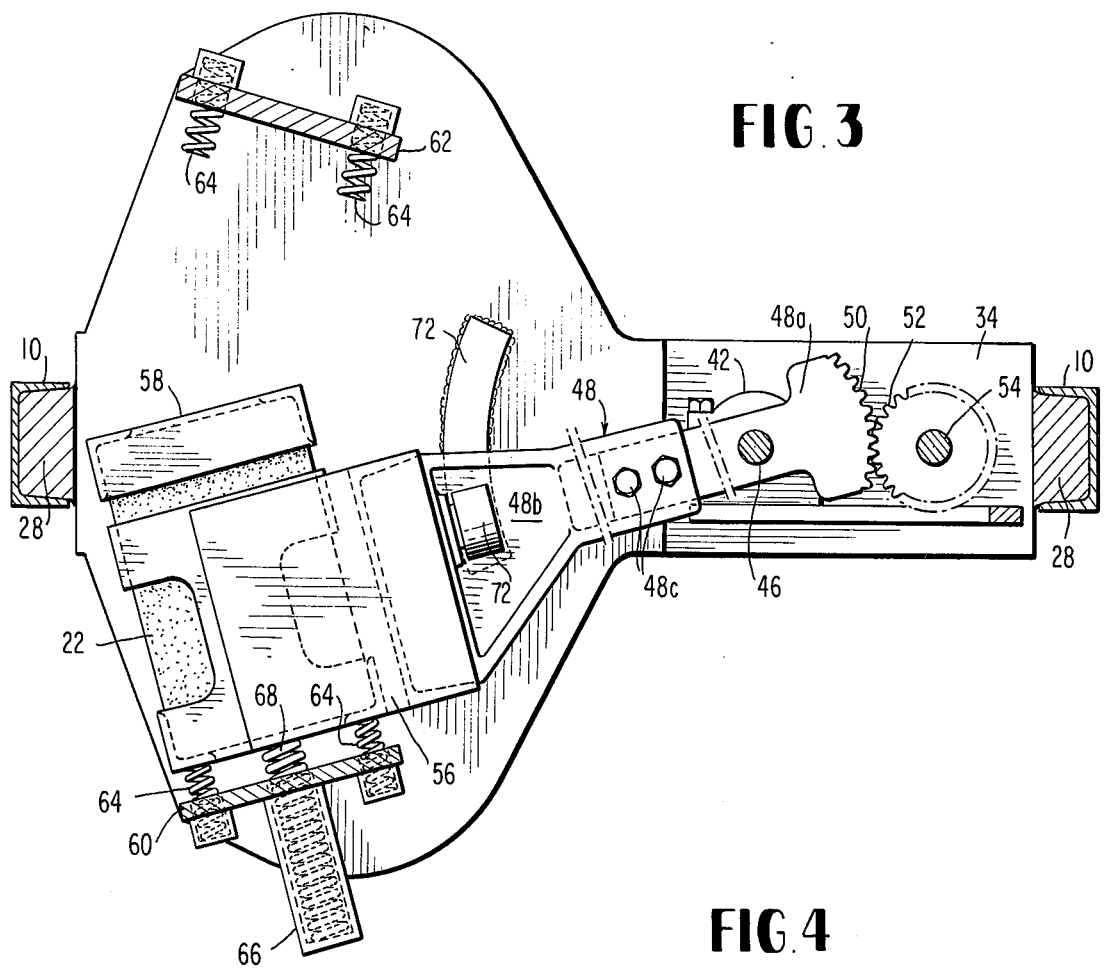
FIG. 3 is a cross-sectional view of the self-generating unit of FIG. 2.

Referring specifically to FIG. 1 of the drawings, a vehicle chassis frame 10 is mounted on road wheels 12 in the usual manner and carries an electric motor 14 for driving at least one set of the road wheels through a differential transmission 16, the motor 14 and transmission 16 being connected by a drive shaft 18 incorporating a universal joint 20. Normally, the motor will be powered by suitable battery means which will be carried by the frame 10 as a dead weight and due to heavy power requirements, large and heavy batteries have been employed. In the present instance, a plurality of batteries 22 respectively are carried by individual motion responsive units 24 to convert reciprocatory motion into rotary drive for regenerating the batteries.

There may be a plurality of battery carrying motion responsive units 24, each including a base frame 26 that readily is mountable within the chassis frame 10. As better shown in FIG. 2, each base frame 26 comprises two end members 28 adapted to be mounted on portions of the chassis frame 10 and connected by opposed side members 30, each including at least two portions 32 and 34 adjustably connected in any suitable manner to accommodate longitudinal variation of the frame according to the limits permitted by the arrangement and disposition of the units 24 relative to the chassis frame 10. In FIG. 2, the two end portions 32 and 34 are shown as being secured directly together by bolted flanges 36 but obviously intermediate spacers 38 may be inserted to vary the length of the frames, as shown in the left hand unit in FIG. 1. Moreover, the flanges 36 may be adjustably secured to the respective portions 32 by bolt and slot connections or the like, as shown in FIG. 2, for minor variations in length.

As better shown in FIGS. 2 and 3, each frame portion 34 has a centrally slotted cross-web or plate 40 supporting two pair of spaced bearing blocks 42 and 44. The bearing blocks 42 journal a cross-pin 46 that pivotally supports a lever 48 which at one end terminates in a gear segment 50 that meshes with a gear 52 that pivotally is mounted on a cross-shaft 54 which is journalled in the bearing blocks 44. At the other end, the lever 48 carries a frame 56 including a cover plate 58 which securely supports a battery 22.

Each frame portion 32 supports a pair of cross-plates 60, 62 which support bumpers 64, such as springs, for engagement with the battery frame 56 and cover 58, respectively, and limit the oscillatory reciprocatory stroke of the lever 48. In addition, the cross-plate 60 has a well 66 carrying a stronger bumper 68, such as a spring, for additionally supporting the weight of the battery 22 when at rest on the downward stroke. Moreover, the inner walls of the frame portions 32 carry bearing plates 70 constituting runways for rollers 72 journalled on opposite sides of the lever 48 adjacent the battery frame 56 to preclude lateral stresses and strains on the lever. To enable adjustment in length of the lever 48 in accordance with the length of the base frame 26, the lever constitutes two parts 48a and 48b releasably secured together as by a slidable fit secured by clamps such as bolts 48c. The part 48a may be mounted on the cross-pin 46 and includes the segment 50 whereas the part 48b includes the battery frame 56 and rollers 72.

The gear 52 is centrally fixed on a sleeve 53 that is freely mounted on the shaft 54, the respective ends of the sleeve being drivingly connected with the inputs of a pair of one-way clutches 74 and 76 disposed on opposite sides thereof. The outputs of clutches 74 and 76 are drivingly connected with the shaft 54. The clutch 74 is operative in one direction, i.e., clockwise rotation only of its input causes clockwise rotation of its output, whereas the clutch 76 is operative in the opposite direction, i.e., counterclockwise rotation only of its input causes clockwise rotation of its output. In this manner, as the gear 52 is oscillated the shaft 54 is driven constantly in the same direction of rotation. A fly-wheel 78 is fixed on the shaft 54 to cause the rotation of the shaft to be more constant despite variations in drive from the lever and a pulley or sprocket 80 also is fixed with the shaft 54 to be driven thereby.

The pulley or sprocket 80 drives a belt or chain 82 which is trained around another pulley or sprocket 84 fixed on a shaft 86 and through a torque brake or one-way clutch 88 drives a power reserve unit 90 that in turn drives a slip clutch pulley or sprocket 92 which is connected by a belt or chain 94 with the drive pulley or sprocket 96 of an alternator or generator 98. The power reserve unit 90 may comprisie comprise coiled spring having its inner end secured to the output shaft of gear transmission 89 whose input shaft is driven by the torque brake 88, the latter preventing overloading of the spring. The outer end of the spring may be fixed to a ring gear that meshes with a pinion which in turn drives the torque brake 92. The specific structure of this arrangement is more completely disclosed in application Ser. No. 374,127 filed June 27, 1973, now U.S. Pat. No. 3,861,487, issued Jan. 21, 1975.

There may be occasions when the vehicle travels over a long distance on a surface that is level and flat so that there is insufficient oscillatory movement of the lever 48 to drive the alternator or generator 98 sufficiently to maintain the electric reserve in the batteries 22. As a safety factor a hand or foot operated lever 100 may be connected with a transmission 102 equivalent to the one-way clutches 74,76 and fly-wheel 78 to drive a shaft 104 which carries a pulley or sprocket 106 around which is trained a belt or chain 108 which also is trained around a pulley or sprocket 110 that is secured through a one-way clutch 112 to the input shaft 86 for the power reserve unit. Thus, the lever 100 may be manually operated to wind the spring within the power reserve unit 90 and in turn drive the alternator or generator 98.

Figure 4:
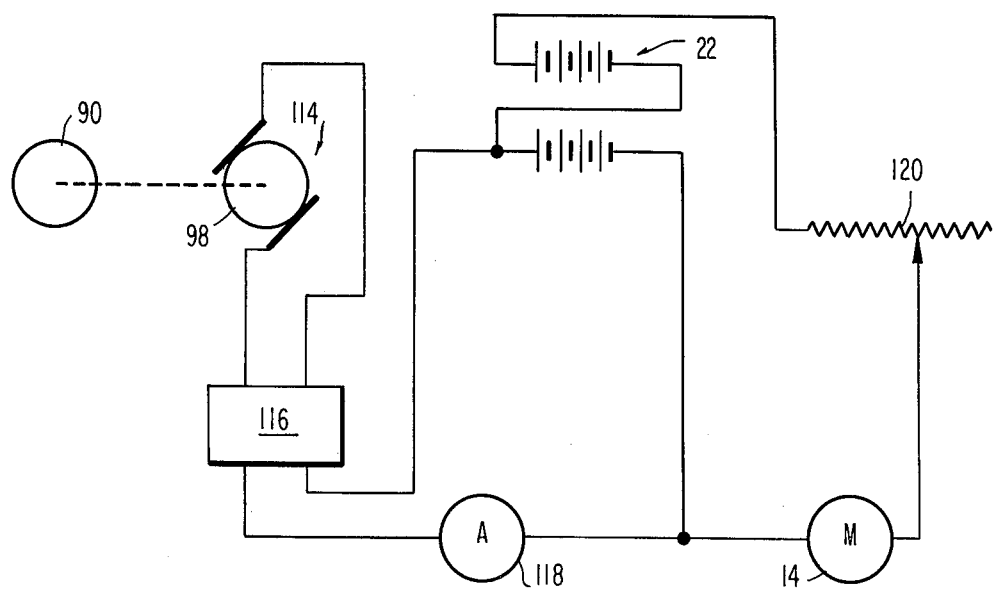
FIG. 4 is a wiring diagram of the system.

As shown in FIG. 4, the generator 98 is connected by circuitry 114 with a voltage regulator 116, an ammeter 118, to the battery means 22 and through a rheostat 120 to electric motor 14. The rheostat may be controlled by a foot or hand lever or any other type of control which would be convenient for the driver of the vehicle. While each power generating unit 24 may be connected to its own individual power reserve unit, it is preferred that the power generating units 24 be connected at least in pairs to one power reserve unit 90 by means of the belts and pulleys or chains and sprockets.

It is believed that the operation of the power generating units will be quite apparent to those skilled in the art. In this regard, it can be appreciated that any movements of the vehicle frame 10 relative to the supporting surface will produce a reciprocatory movement of the lever 48 of each power generating unit 24. Such alternating oscillatory movement of the levers will be translated by the engaging segment 50 and gear 52 to continuous one-way rotation of the shaft 54. Through the belt or chain drive transmission the shaft 54 will rotate the shaft 86 that, through the connective gearing 89, drives the power input shaft of the power reserve unit 90.

The power reserve unit 90 will supply additional power for the electric drive motor 14 and/or battery means 22 when the vehicle 10 has stopped, as at a stop signal, or in coasting, until the power reserve is depleted. It can be appreciated that the power reserve unit will enable a smaller battery group to be used and will permit the battery group to operate for a considerably longer period of time over a greater distance than with the original charge of the batteries 22.

It will be apparent that a plurality of the units 24, which can be prefabricated and adjusted to size, can be mounted on a vehicle or within the frame 10 thereof according to the power requirements for the particular electric system to which the batteries are connected. The individual mounting of the batteries within the units 24 necessarily spaces the batteries so that they are individually subject to air circulation and thereby cooled. The units 24 preferably are arranged in pairs and disposed in opposite relation so that the weights and forces involved offset each other. Moreover, the movable supports for the batteries eliminates the dead weight of the batteries and instead employs their weight for effecting postive work.

The batteries preferably are connected in series so that voltages are cumulative in energizing the electric equipment to which they are connected. Thus eight 6-volt batteries spaced around the vehicle can cumulatively supply 48 volts for energizing a 48-volt motor which has sufficient power to drive a vehicle. Obviously, the number of units 24 can be varied according to electrical requirements. As previously stated the batteries can be connected with the power reserve means in any suitable manner such as in pairs to one power reserve unit or all of the units 24 may be connected through suitable gear arrangements with a central power reserve unit.

While the specific disclosure is limited to an automotive land vehicle, particularly to the power system for driving the vehicle, it will be obvious that the invention may be adapted for use with any type of electric system in any type of vehicle including water craft and air craft, as long as there is sufficient movement of the supporting frame or chassis, transverse the direction of travel, to cause reciprocal movement of the battery supporting means. Thus, the invention may be employed for supplying power for lighting systems, communication systems, pumps for hydraulic control systems, or any other apparatus powered by electricity.

I claim:

1. A vehicle having a frame supporting an electric system and battery means for operating said system, comprising two relatively reciprocatory parts on said frame means supporting one said part from the other said part for reciprocatory movement in accordance with variations in the supporting medium, at least one of said parts being reciprocatory relative to the vehicle frame, means connected between such parts for converting such reciprocal movement into rotary mechanical power, power reserve means receiving and storing said rotary mechanical power, and current generating means for recharging said battery and driven by said power reserve means, said battery means comprising a plurality of batteries and said one part comprising means individually supporting said batteries in spaced relation for reciprocal movement relative to the vehicle frame.

2. A vehicle according to claim 1 wherein said one part comprises a plurality of means each supporting one said battery and connected with said reciprocal to rotary movement converting means.

3. A vehicle according to claim 2 wherein said battery supporting means each comprises a pivotally mounted lever having battery carrying means at one end and including gear means engaged with said movement converting means.

4. A vehicle according to claim 3 wherein said battery supporting means comprises a rectangular frame including means at one end portion thereof supporting said lever and said movement converting means, said lever gear means comprising a segment on the end of said lever opposite the battery carrying means end, and said movement converting means comprising a shaft, a pinion freely mounted on said shaft and in mesh with said segment, and a pair of one-way clutches respectively connected between said pinion and said shaft and operative in opposite directions to convert oscillation of said pinion to constant direction rotation of said shaft.

5. A vehicle according to claim 3 wherein battery supporting means comprises a rectangular frame including means at one end portion thereof supporting said lever and said movement converting means, and means at the other end portion thereof for limiting movement of said battery.

6. A vehicle according to claim 5 wherein said lever is pivotal about a horizontal axis and said battery movement limiting means comprises stop means including resilient bumper means respectively above and below said battery.

7. A vehicle according to claim 6 wherein said battery movement limiting means comprises bearing surfaces on opposite sides of said other end portion of said frame, and rotatable means on opposite sides of said lever adjacent said battery and engaged respectively with said bearing surfaces to preclude lateral movement of said lever.

8. A vehicle according to claim 7 wherein said rectangular frame and said lever are adjustable in length to fit available space in said vehicle.

9. A vehicle according to claim 8 wherein said frame comprises at least two parts respectively including said end portions and having side frame members, and means releasably connecting the side frame members of said parts.

10. A vehicle according to claim 1 further comprising a manually operable reciprocal lever, a second reciprocal to rotary motion converting means driven by said lever, and means connecting the rotary output of said latter means to said power reserve means.

* * * * *